United States Patent
Gianvito et al.

[11] Patent Number: 5,860,512
[45] Date of Patent: Jan. 19, 1999

[54] SLIDING BELT TURN CONVEYOR

[75] Inventors: Rodolfo Gianvito, Oakville; John A. Krznarich, Burlington; Allan D. Ewing, Georgetown, all of Canada

[73] Assignee: Mannesmann Dematic Rapistan Corp., Grand Rapids, Mich.

[21] Appl. No.: 873,343

[22] Filed: Jun. 11, 1997

Related U.S. Application Data

[63] Continuation-in-part of Ser. No. 704,948, Aug. 29, 1996.

[51] Int. Cl.[6] ............................ B65G 15/02; B65G 21/16
[52] U.S. Cl. ........................ 198/841; 198/831; 198/835; 198/838
[58] Field of Search ................................. 198/831, 841, 198/835, 838

[56] References Cited

U.S. PATENT DOCUMENTS

| | | | |
|---|---|---|---|
| 735,722 | 8/1903 | Dennis . | |
| 1,578,303 | 3/1926 | Walter et al. . | |
| 1,698,786 | 1/1929 | Finn . | |
| 1,972,753 | 9/1934 | Bausman | 198/25 |
| 2,320,667 | 6/1943 | Smith | 198/233 |
| 2,619,222 | 11/1952 | Przybylski | 198/233 |
| 2,725,757 | 12/1955 | Murphy | 74/240 |
| 3,214,007 | 10/1965 | Matthies et al. | 198/195 |
| 3,217,861 | 11/1965 | Daniluk et al. | 198/182 |
| 3,237,754 | 3/1966 | Freitag, Jr. et al. | 198/182 |
| 3,616,983 | 11/1971 | Kamimura et al. | 228/5.1 |
| 3,661,244 | 5/1972 | Koyama | 198/184 |
| 3,901,379 | 8/1975 | Bruhm | 198/182 |
| 3,951,256 | 4/1976 | Gurewitz | 198/182 |
| 4,203,512 | 5/1980 | Ammeraal | 198/594 |
| 4,724,953 | 2/1988 | Winchester | 198/836 |
| 4,846,338 | 7/1989 | Widmer | 198/831 |
| 4,955,466 | 9/1990 | Almes et al. | 198/831 |
| 5,332,082 | 7/1994 | Sommerfield | 198/831 |
| 5,335,966 | 8/1994 | Vogtherr | 297/287 |
| 5,360,102 | 11/1994 | Schöning | 198/831 |
| 5,609,310 | 3/1997 | Kobayashi | 242/334.6 |

FOREIGN PATENT DOCUMENTS

| | | |
|---|---|---|
| 464877A | 1/1992 | European Pat. Off. . |
| 2365502 | 9/1977 | France . |
| 4113051 | 4/1995 | Germany . |
| 8702617 | 11/1987 | Netherlands . |
| 8700592 | 10/1988 | Netherlands . |
| 8700593 | 10/1988 | Netherlands . |
| 4020226A | 1/1992 | United Kingdom . |
| WO94/27895 | 12/1996 | WIPO . |

*Primary Examiner*—Karen M. Young
*Assistant Examiner*—Thuy V. Tran
*Attorney, Agent, or Firm*—Van Dyke, Gardner, Linn & Burkhart, LLP

[57] ABSTRACT

A belt turn conveyor includes a sliding belt frame having first and second generally stationary vertical bearing surfaces and first and second generally stationary horizontal bearing surfaces. An endless belt is rotationally supported by the sliding belt frame and includes means for engaging the vertical bearing surfaces for retaining the endless belt on said sliding belt frame. Endless belt includes a strip of or a plurality of segments of low friction flexible material which is secured to the endless belt for engaging the horizontal surfaces of the sliding belt frame to restrain vertical movement of said endless belt.

34 Claims, 5 Drawing Sheets

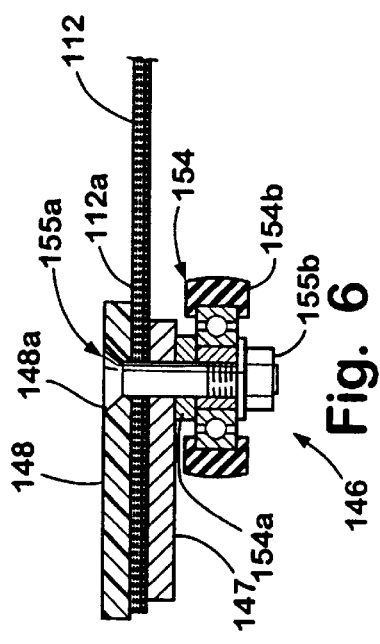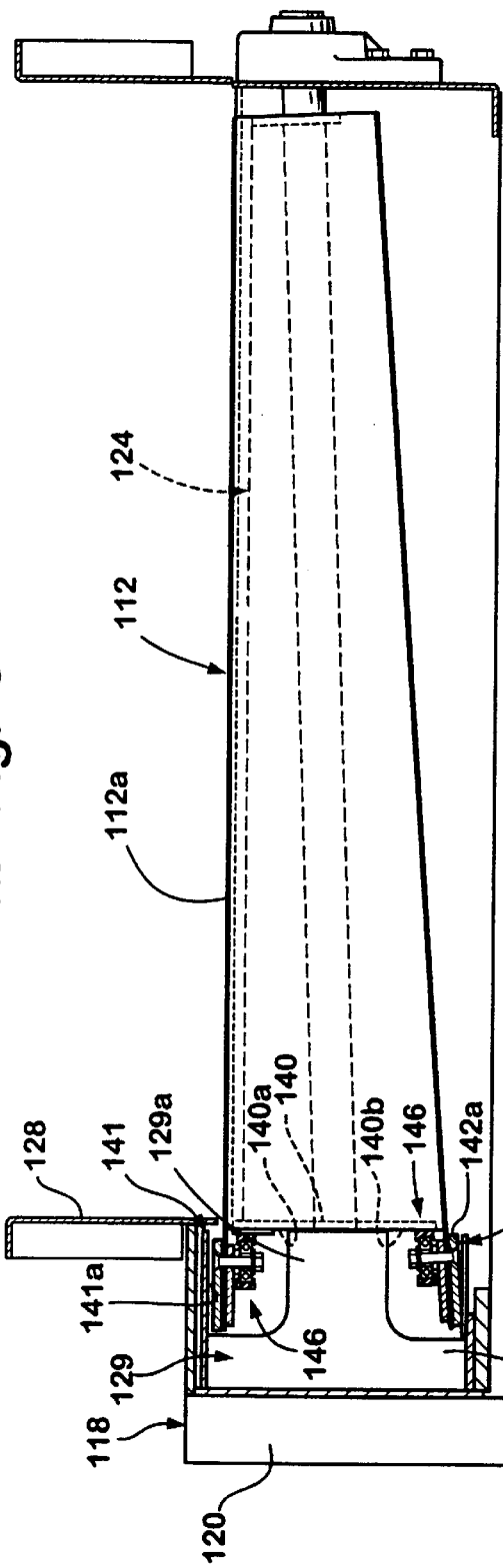

SLIDING BELT TURN CONVEYOR

This is a continuation in part of U.S. patent application for SLIDING BELT TURN CONVEYOR, filed on Aug. 29, 1996, Ser. No. 08/704,948 which is incorporated herein by reference in its entirety.

BACKGROUND OF THE INVENTION

This invention relates generally to a transporting apparatus and, more particularly, to belt turn conveyors, which extend around a curve.

Belt turn conveyors are used to interconnect generally straight conveyor sections that are aligned in different directions and can provide a turn of up to 180°. Such turn conveyors conventionally include a pair of pulleys, one at each end of the conveyor, and a continuous belt having a smaller length at the inner radius of the turn and a longer length toward the outer radius of the turn. The pulleys and belt are supported by a conveyor frame. The conveyor frame typically includes radially spaced legs and horizontal members connecting the legs, which provide a planar support surface for the upper portion of the belt. In operation, especially when the belt is laden with packages or articles to be transported, the belt experiences radial forces, which tend to pull the belt off the pulleys away from the frame toward the inner radius of the conveyor and to cause the belt to ride off the conveyor frame. Various means are provided to retain the belt on the turn conveyor.

For example, in U.S. Pat. No. 4,955,466 to Almes et al., the conveyor belt is provided with an enlarged distal edge (3), which is captured between upper and lower rollers supported on the conveyor frame. The rollers are angled so that they bear on an inner, downwardly sloping side of the enlarged edge of the belt and make a line contact with the enlarged edge of the belt. Under high speeds of operation, however, the enlarged edge (3) may tend to distort and flatten so that the belt is not adequately restrained in the vertical direction.

In U.S. Pat. No. 5,332,082 to Sommerfield, a conveyor turn is disclosed which includes a plurality of roller assemblies that are secured along the edge of the belt and engage a guide surface provided by a slotted guide rail (31). The vertical movement of the belt is not, however, restrained at its upper portion; instead, the belt is free to lift off the horizontal support member (32) until it makes contact with the free edge of the slotted guide rail. Consequently, the belt may be subject to increased wear and may experience a shortened operational life.

To overcome the problem of belts lifting off their supports, some conveyors have employed two sets of wheels, one set of wheels restrains the belt from sliding off the support and the other set of wheels restrains the belt from lifting off the support. For example, in German Document Patent No. DE 41 13 051 C2 discloses two sets of wheel assemblies. However, the supporting structure, which provide the guide rails for the wheels, is complicated and generally increases the overall height of the turn conveyor. Furthermore, the spacing between the turn conveyor and the adjacent straight conveyor section is increased in order to accommodate the wheels assemblies and the wheel guide rails. When the space between the adjacent conveyor sections is increased, smaller packages may fall between the adjacent conveyor sections or may get caught between the sections. Moreover, with the increase in number of wheel assemblies there is a significant increase in noise.

Therefore, there is a need for a belt turn conveyor which provides means for restraining the belt from lifting off the sliding belt frame while minimizing the space between adjacent belt conveyor sections and the overall height of the belt turn conveyor. Furthermore, there is a need for a belt turn conveyor which provides means for restraining the belt from lifting off the sliding belt frame which will reduce the noise of the conveyor when the belt run conveyor is operation. Moreover, there is a need for a belt that is relatively easy to install and replace.

SUMMARY OF THE INVENTION

The present invention provides a belt turn conveyor that is exceptionally quiet, includes reduced spacing requirements between adjacent conveyor sections, and is easy to maintain and repair. Furthermore, the belt turn conveyor includes an endless belt that is lighter and easier to handle.

According to one aspect of the present invention, a belt turn conveyor includes a sliding belt frame having first and second generally vertical bearing surfaces and first and second generally horizontal bearing surfaces. An endless belt is rotationally supported by the sliding belt frame, which includes a restraint or restraining devices for engaging the vertical bearing surfaces for retaining the endless belt on the sliding belt frame. The vertical restraint includes a strip of low friction flexible material or a plurality of segments of low friction flexible material, which are secured to the endless belt for engaging the horizontal bearing surfaces to restrain the vertical movement of the endless belt.

The low frictional flexible material is preferably a felt material or a belt material, such as a needle point material, and is secured to an upper surface of the belt to engage the horizontal bearing surfaces of the sliding belt frame to thereby restrain the endless belt from lifting off the sliding belt frame.

In other forms, the horizontal restraint comprises a plurality of horizontal restraints, which are secured to the endless belt by fasteners. Preferably, the low friction flexible material is secured to the endless belt by at least one of an adhesive, a plurality of stitches, and at least one of the fasteners. In one form, the strip comprises an elongated strip that extends substantially over the full length of the endless belt to provide a generally continuous engaging surface. In another form, the endless belt includes a plurality of spaced segments or patches of low friction flexible material. In this manner, the belt remains flexible for rolling over the pulleys.

According to another aspect, an endless belt assembly for a belt turn conveyor is disclosed which includes a conical shaped endless belt having an inner edge and an outer edge. The dimension of the inner edge is less than the dimension of the outer edge. A plurality of spaced restraints are secured to the endless belt for retaining the endless belt on a sliding belt frame. The restraints may include bearing assemblies, such as rollers, for engaging a generally vertical bearing surface of the sliding belt frame to prevent the endless belt from sliding off the sliding belt frame. A strip or a plurality of spaced apart segments of low friction flexible material are secured to the endless belt for engaging upper and lower horizontal bearing surfaces of the sliding belt frame to limit the vertical movement of the endless belt.

In one form the strip or segments are secured to the conveyor belt by stitches. In other forms, the strip or segments are secured to the conveyor by an adhesive. Furthermore, the restraints may be secured to the belt by a fastener that extends through the strip or segments and the endless belt.

According to another aspect, a belt turn conveyor includes a bracket adapted for securing to a vertical support and a belt support surface supported by the bracket. An endless belt rides on the support surface. The belt turn conveyor further includes first, second, and third bearing plates secured to the bracket to provide bearing surfaces. To retain the endless belt on a curved path of the belt turn conveyor, a plurality of restraints are provided which are mounted to the endless belt, with a first set of restraints adapted to engage the first plate. At least one of the restraints comprises an elongated strip or a plurality of spaced patches or segments of low friction flexible material secured to the endless belt to engage the second and third plates for restraining the vertical movement of the belt.

It will be understood, the endless belt turn conveyor of the present invention provides numerous advantages over prior known belt turn conveyors. The belt turn conveyor provides vertical and lateral restraint of the endless belt on the conveyor without increasing the spacing between the turn conveyor and the adjacent conveyor sections or increasing the overall height of the conveyor. Further, the sliding belt is lighter and more flexible and, therefore, easier to install. Moreover, the endless belt turn conveyor produces less noise during the belt turn conveyor's operation.

These and other objects, advantages, and features of this invention will become apparent upon review of the following specification in conjunction with the drawings.

BRIEF DESCRIPTION OF THE DRAWINGS

FIG. 5 is a cross-sectional view taken along the line V—V in FIG. 4; and

FIG. 6 is an enlarged cross-sectional view taken along line IV—IV of FIG. 4.

DESCRIPTION OF THE PREFERRED EMBODIMENT

Figure 1:
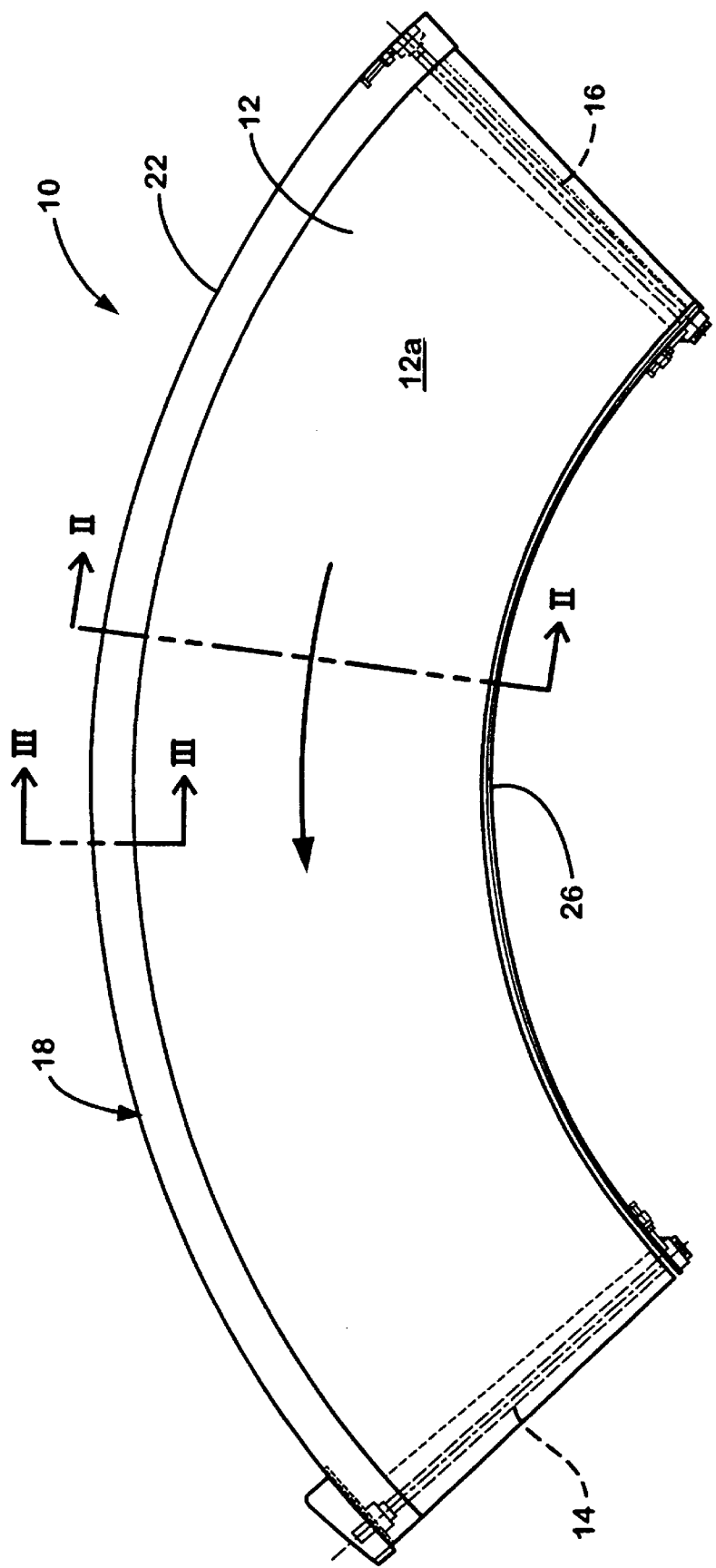
FIG. 1 is a top plan view of a belt turn conveyor, according to the invention.

Referring now specifically to the drawings and the illustrative embodiments depicted therein, a belt turn conveyor 10 includes an endless belt 12 driven by a driver pulley 14 and an idler pulley 16 (FIG. 1). As is conventional, endless belt 12 has a shorter inner length at an inner conveyor end 26 than an outer length at an outer conveyor end 22. Endless belt 12 is preferably a single piece of belt material formed into a ring-shape. Endless belt 12 may comprise a single belt connected at its ends by belt-splicing devices, such as fasteners or mechanical lacing or the like. Furthermore, endless belt 12 may also comprise several sector-shaped pieces joined at the respective ends by belt splicing devices. Therefore, the term "endless belt" when used to described belt 12 includes spliced belts as well as ring-shaped belts. Pulleys 14, 16 are preferably tapered to frictionally engage the endless belt 12 over its full width so that endless belt 12, which is stretched between the two pulleys 14 and 16, may be driven by pulley 14. However, it should be understood that conventional cylindrical pulleys may be used. Belt 12 and pulleys 14, 16 are supported by a support frame 18.

Figure 2:
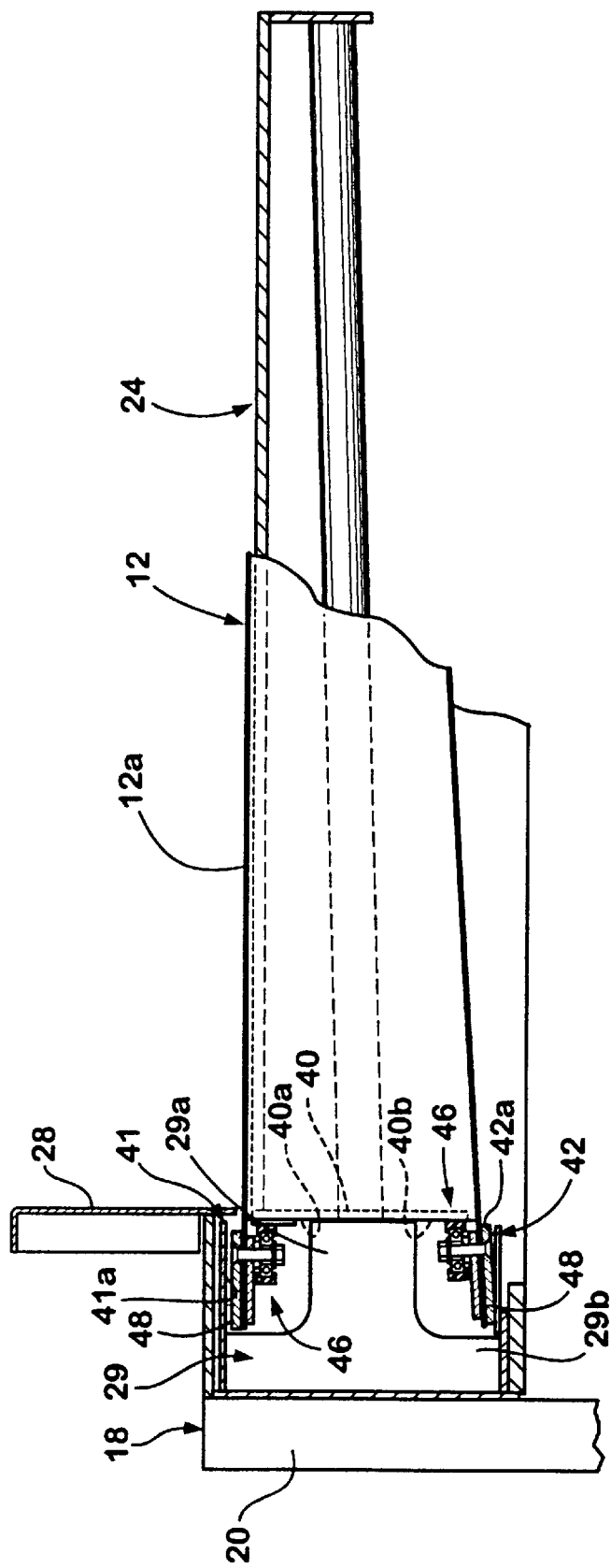
FIG. 2 is a cross-sectional elevational view taken along line II—II in FIG. 1.
Figure 3:
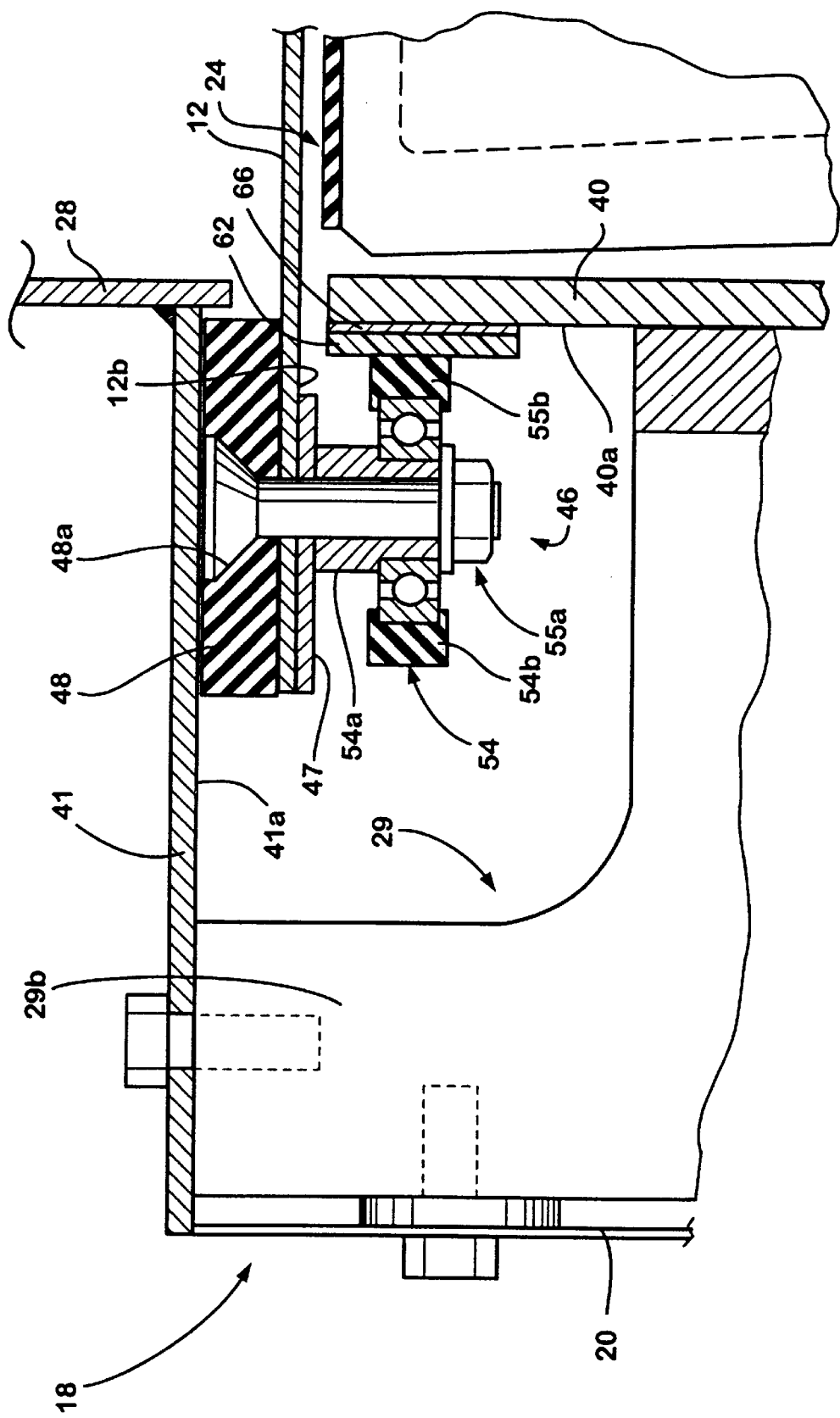
FIG. 3 is an enlarged cross-sectional view taken along the line III—III in FIG. 1.

Referring to FIG. 2, sliding belt support frame 18 includes a vertical support 20 at outer end 22 of the belt turn and a support beam 24 which, in the illustrated embodiment, is cantilevered from vertical support 20 by a plurality of support brackets 29, which are spaced along the outer perimeter of the bend turn conveyor 10 below an outer guard rail 28. Alternatively, the support beam may supported at both ends. The details of the support beam 24 and mounting of beam 24 to bracket 29 are disclosed in commonly owned pending application Ser. No. 08/600,593 filed Feb. 13, 1996 by John Krznarich for a BELT TURN CONVEYOR, the disclosure of which is incorporated herein by reference and will not be repeated. Suffice to say each support bracket 29 includes a central web portion 29a and a flange portion 29b. Mounted to web portion 29b of bracket 29 is a first bearing member 40. In the illustrated embodiment, first bearing member 40 comprises a plate, which is rigidly secured to the distal end portion of web portion 29a, preferably by welds, fasteners, or the like. First bearing member 40 includes upper and lower generally vertically oriented bearing surfaces 40a and 40b. Upper and lower bearing surfaces 40a and 40b provide upper and lower vertical wheel guides or rails that extend the entire length of outer end 22 of support frame 18. Second and third bearing members are provided by bearing plates 41 and 42. Bearing plates 41 and 42 extend over and are rigidly secured to the upper and lower ends of flange portion 29b, respectively, to provide upper and lower generally horizontally oriented bearing surfaces 41a and 42a that project horizontally from the upper and lower ends of the bracket flange portion 29b. In a similar manner, horizontally oriented bearing surfaces 41a and 42a provide horizontal guides or tracks for a vertical restraint. The guides or tracks preferably extend the entire length of outer end 22 of support frame 18, as will be discussed below. Bearing members 41 and 42 are rigidly secured to bracket 29 preferably by welds, fasteners, or the like.

To retain the endless belt 12 in the curved path of the belt turn conveyor 10, belt 12 includes horizontal and vertical restraints or restraining devices which engage the vertical and horizontal bearing surfaces provided by bearing members 40, 41, and 42. As best seen in FIG. 2, the horizontal or lateral movement of belt 12 is preferably restrained by a plurality of bearing assemblies, such as wheel assemblies 46. Wheel assemblies 46 are secured to the proximate edge portion of belt 12 by fasteners 55a. Each wheel assembly 46 includes a wheel 54, which is mounted to a wheel support plate 47 and to the proximate edge portion of belt by fastener 55a. Preferably, each wheel 54 comprises a tire 54b, for example a tire, such as a plastic or polymeric tire, which is mounted on a bushing 54a. Each fastener 55a extends through belt 12, a respective wheel support plate 47, and a respective bushing 54a and is secured thereto by a nut 55b. Each wheel assembly 46 extends generally perpendicular from a lower surface 12b of the endless belt so that tires 54b engage upper and lower vertical bearing surfaces 40a and 40b of bearing member 40 to thereby restrain the lateral movement of belt 12.

In order to reduce the friction and wear on bearing member 40, bearing member 40 may be provided with liners 62. Liners 62 are preferably releasably attached to the first bearing member 40 so that they can be replaced. In the illustrated embodiment, wheels 54 include outer tires made from a plastic or polymeric material, such as urethane, and liners 62 are made from a metal, such as steel. This plastic-to-metal interface reduces noise. Conversely, wheels 54 may have outer tires made from a metal, such as steel, and liners 62 may be manufactured from a plastic or polymer, such as urethane. This also provides a plastic-to-metal interface which reduces noise. Liners 62 may be mounted to member 40 by a hook and loop fabric fasteners 66, such as the type marketed under the brand VELCRO®. This allows for rapid replacement of liners 62.

In order to restrain the vertical movement of belt 12, belt 12 includes a vertical restraint in the form of a low friction strip 48. Strip 48 preferably extends over the full length of the outer proximate edge of belt 12 and comprises an elongated strip of low friction, flexible material, such as felt or a belt material. More preferably, elongated strip 48 comprises a needlepoint fabric and, most preferably, a NPF 60 belt available from Leder Belt of Germany. Elongated strip 48 is secured to a top surface 12a and proximate edge portion of endless belt 12 so that endless strip 48 is sandwiched between belt 12 and second and third bearing members 41 and 42. Elongated strip 48 may be secured to belt 12 by an adhesive, which is preferably provided by Leder Belt, stitching, or by fasteners 55a, which secure wheel assemblies 46 to belt 12. In order to prevent the ends of fasteners 55a from engaging members 41 and 42, elongated strip 48 preferably includes a plurality of spaced countersunk holes 48a to accommodate the head of fastener 55a. To reduce the friction between strip 48 and members 41 and 42, members 41 and 42 preferably comprise hot or cold rolled carbon steel, stainless steel, or chromium plated steel plates. Furthermore, bearing plates 41 and 42 may have a ceramic surface or TEFLON® surface to reduce the heat that may develop between elongated strip 48 and the respective bearing plates 41 and 42.

It has been found that endless belt 12 is well suited for a wide range of speeds. In the 250–300 FPM (Foot Per Minute) range, elongated strip 48 on endless belt 112 engages the planar surfaces of bearing plates 41 and 42. However, at speeds generally above 300 FPM, the planar surfaces of the bearing plates 41 and 42 may include a plurality of relief rollers/wheels (not shown) to reduce the friction even further and, therefore, reduce the heat that is typically generated at these higher speeds.

Elongated strip 48 restrains the upward vertical movement of endless belt 12 and significantly reduces the overall height of the assembly 10. It has been found that the elongated strip 40 provides a significant reduction in the noise level of the belt turn conveyor 10 and, furthermore, the smaller profile reduces the spacing between adjacent conveyor sections. Moreover, the replacement of the endless belt 112 is made more simple as the weight of the belt of the wheel is significantly reduced. In general, the endless belt is easier to handle and, therefore, easier to install.

SECOND EMBODIMENT

Figure 4:
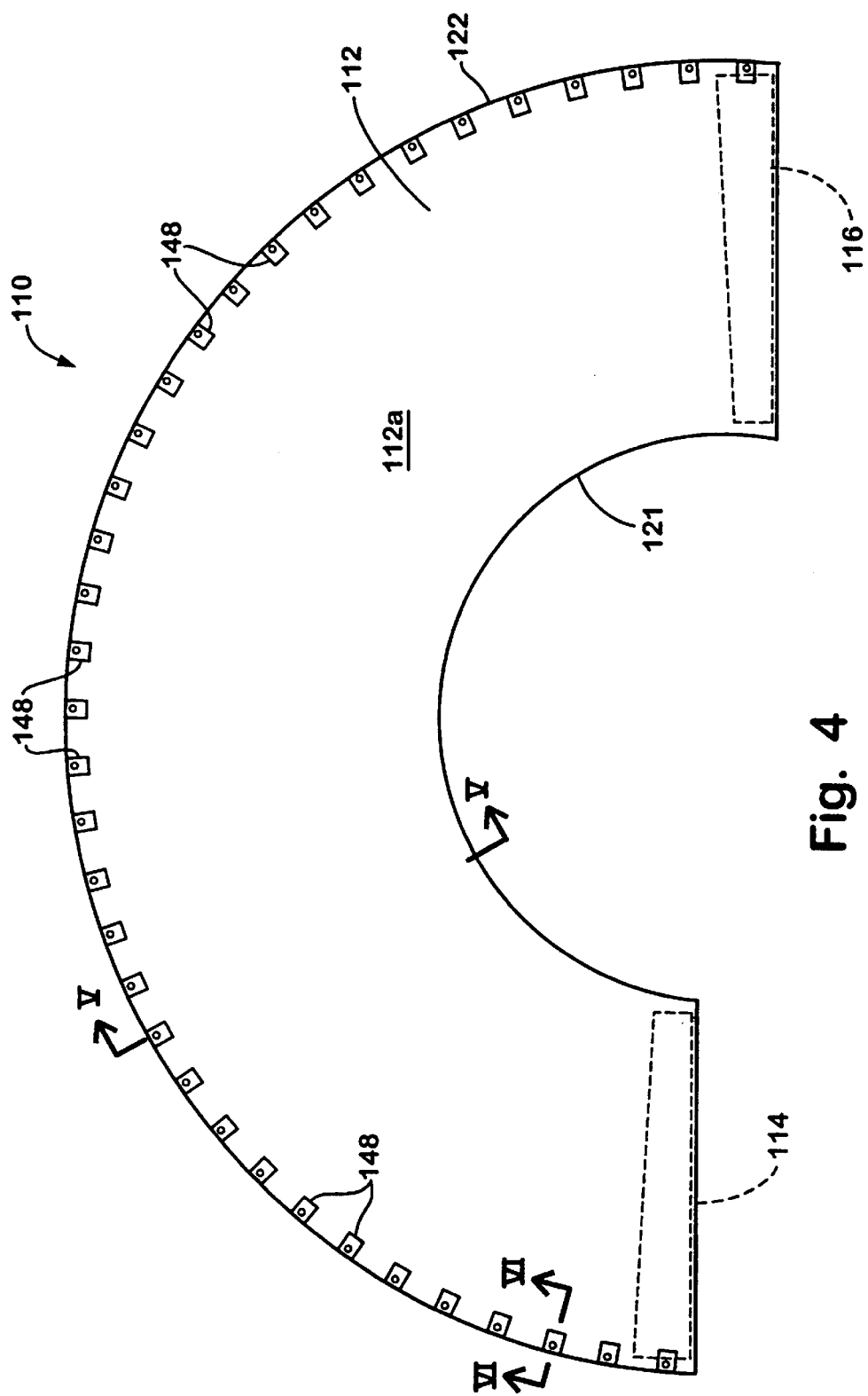
FIG. 4 is a top plan view of a second embodiment of the belt turn conveyor.

Referring to FIGS. 4–6, a second embodiment of a belt turn conveyor 110 is illustrated. In a similar manner to the first embodiment, belt turn conveyor 110 includes an endless belt 112, which is driven by a driver pulley 114 and an idler puller 116 and supported on a sliding belt support frame 118. Similar to the previous embodiment frame 118 includes a vertical support 120 and a support beam 124, which is mounted to vertical support 120 by a plurality of support brackets 129, which are spaced along the outer perimeter of conveyor 110 below an outer guard rail 128. As best seen in FIG. 4, belt turn conveyor 110 has a shorter inner diameter than outer diameter. Consequently, endless belt 112 has a shorter inner length at an inner end 121 of the conveyor than outer length at the outer conveyor end 122. Endless belt 112, pulleys 114 and 116, and support frame 118 are of similar construction to endless belts 12, pulleys 14, 16, and support frame 18 and, therefore, reference is made to the first embodiment of the belt turn conveyor for further details.

In a similar manner to the first embodiment, endless belt 112 is retained in the curve path of belt turn conveyor 110 by horizontal and vertical restraints. As best seen in FIG. 5, the horizontal restraint comprise a plurality of bearing assemblies 146 which are mounted along the proximate edge portion of endless belt 112. Each bearing assembly 146 includes a wheel support 147 and a wheel 154 which is mounted on wheel support 147 by a bushing 154a. Each bearing assembly 146 is mounted to endless belt 112 in spaced intervals by a fastener 155a, which extends through bushing 154a, wheel support 147, and the edge portion of endless belt 112 to the inner surface of belt 112 and is secured thereto by a nut 155b, as will be more fully described below. Similar to the first embodiment, wheels 154 engage upper and lower vertical bearing surfaces 140a and 140b provided by first bearing member 140 as the endless belt 112 is moved along the curved path of the belt turn conveyor 110 by pulleys 114 and 116.

Referring to FIGS. 5 and 6, endless belt 112 is restrained from vertical movement by a plurality of spaced apart segments or patches 148. Preferably, segments or patches 148 comprise a low friction, flexible material, such as felt or a belt material. More preferably, each segment patch 148 is a needle point fabric and, most preferably, an NPF 60 belt available from Leder Belt of Germany. Segments 148 are mounted on a top surface 112a of endless belt 112 adjacent the edge portion of endless belt 112. Segments 148 may be secured to endless belt by an adhesive, which is preferably provided by Leder Belt, stitches, and/or by fasteners 155a. Preferably, segments 148 are secured to endless belt 112 at the same spaced intervals as the respective bearing assemblies 146. In this manner, the respective fastener 155a of each bearing assembly may further secure a respective segment 148.

As best seen in FIG. 6, fasteners 155a preferably include a flat counter sunk head screw so that the head of fasteners 155a may be flush with the upper surface of the respective segments 148. More preferably, each segment 148 includes at least one counter sunk hole 148a so that the respective fastener 155a is flush or below the upper surface of each respective segment 148 to avoid contact between fasteners 155a and upper and lower horizontal bearing surfaces 141a and 142a provided by second and third bearing members 141 and 142.

It should be understood that bearing assemblies 146 may alternatively include rollers, or the like. Preferably, bearing assemblies 146 include wheels or rollers with tires 154b or an outer bearing surface made from plastic or a polymeric material such as urethane, which reduces the noise during operation. It should be understood from the foregoing that segments 148 may be secured to belt 112 in any combination of the methods described above including other methods which are known to those having ordinary skill in the art.

In a similar manner to the previous embodiment, each segment 148 is sandwiched between endless belt 112 and generally horizontally oriented bearing surfaces 141a and 142a of the second and third bearing members 141 and 142. It has been found that endless belt 112 with a plurality of spaced apart segments or patches 148 even further reduces the friction and heat that can be generated at higher speeds. Segments 148 restrain the upper vertical movement of endless belt 112 and, therefore, like the earlier embodiment, eliminate the need for a second set of wheel assemblies. Moreover, in addition to the reduction in noise, spaced apart strips 148 maintain a smaller profile for belt turn conveyor 110 and segments 148 make belt 112 even more flexible to roll over pulleys 114 and 116. Furthermore, the spaced apart segments 148 permit belt 112 to stretch when belt 112 is heavily loaded. It can be appreciated from the foregoing description that endless belt 112 is even lighter and generally easier to handle and install than the conventional endless belts.

Although the invention is described as it pertains to a belt turn conveyor, it may be applied to other belt conveyors including straight sections of belt transport conveyors and belt accumulation conveyors.

Changes and modifications in the specifically described embodiments can be carried out without departing from the principles of the invention which is intended to be limited only by the scope of the appended claims, as interpreted according to the principles of patent law including the doctrine of equivalents.

We claim:

1. A belt turn conveyor comprising:
a sliding belt frame having first and second stationary, generally vertical bearing surfaces and first and second stationary, generally horizontal bearing surfaces;
an endless belt rotationally supported by said sliding belt frame, said endless belt having a horizontal restraint engaging said generally vertical bearing surfaces restraining horizontal movement of said endless belt on said sliding belt frame, and a vertical restraint engaging said horizontal bearing surfaces restraining vertical movement of said endless belt on said sliding belt frame; and
wherein said vertical restraint includes low friction material secured to said endless belt.

2. The belt conveyor of claim 1, wherein said low friction material comprises a material selected from the group consisting of a felt material and a woven belt material.

3. The belt turn conveyor of claim 2, said sliding belt frame including a support beam supported from said bracket, said support beam supporting said endless belt thereon.

4. The belt turn conveyor of claim 2, further comprising a bearing member secured to said bracket, said bearing member extending above and below a portion of said bracket portion and providing said vertical bearing surfaces.

5. The belt conveyor of claim 1, wherein said low friction material comprises a needle point material.

6. The belt turn conveyor of claim 1, wherein low friction material is secured to said endless belt by at least one of an adhesive, a plurality of stitches, and at least one fastener.

7. The belt turn conveyor of claim 1, wherein said vertical restraint comprises a plurality of segments of low friction material, each of said segments being secured to said endless belt by at least one of an adhesive, a plurality of stitches, and a fastener.

8. The belt turn conveyor of claim 7, wherein said horizontal restraint comprises a plurality of horizontal restraints, each of said horizontal restraints being secured to said endless belt by a fastener.

9. The belt turn conveyor of claim 8, wherein each of said segments is secured to said endless belt by at least one of said fasteners.

10. The belt turn conveyor of claim 1, wherein said vertical restraint comprises a strip of low friction material, said strip being secured to said endless belt by at least one of an adhesive, a plurality of stitches, and a plurality of fasteners.

11. The belt turn conveyor of claim 10, wherein said strip comprises an elongated strip, said elongated strip extending along and being secured to a proximate longitudinal edge of said endless belt.

12. The belt turn conveyor to claim 1, wherein said horizontal restraint is secured to a proximate edge portion of said endless belt.

13. The belt turn conveyor of claim 12, further comprising first and second bearing members secured to said bracket, said first and second members providing said generally horizontal bearing surfaces.

14. The belt turn conveyor of claim 1, said sliding belt frame including a bracket, said vertical and horizontal bearing surfaces being provided on said bracket.

15. The belt turn conveyor of claim 1, wherein said horizontal restraint comprises a plurality of bearing assemblies.

16. An endless belt assembly for a belt turn conveyor, said belt turn conveyor including a frame, a bracket secured to the support frame, a support beam supported by the frame on the bracket, the bracket including upper and lower generally horizontal bearing tracks and upper and lower generally vertical bearing tracks, said endless belt assembly comprising:
an endless belt;
a plurality of spaced bearing assemblies secured to said endless belt, said bearing assemblies including rollers adapted to engage the generally vertical bearing tracks of the bracket for retaining said endless belt on the support beam; and
one of a strip of low friction flexible material and a plurality of segments of low friction flexible material secured to said endless belt, said one of a strip and a plurality of segments adapted to engage the upper and lower horizontal bearing tracks of the bracket to restrain the vertical movement of said endless belt.

17. An endless belt assembly according to claim 16, wherein said low friction flexible material comprises a material selected from the group consisting of a woven belt material and a felt material.

18. An endless belt assembly according to claim 16, wherein said low friction flexible material comprises a needle point material.

19. An endless belt assembly according to claim 16, wherein said low frictional flexible material is secured to said endless belt by an adhesive.

20. An endless belt assembly according to claim 16, wherein said strip of low friction flexible material is secured to said endless belt by stitches.

21. An endless belt assembly according to claim 16, wherein each of said bearing assemblies are secured to said endless belt by a fastener.

22. An endless belt assembly according to claim 21, wherein said fasteners extend through said low friction flexible material.

23. An endless belt assembly according to claim 21, wherein said fasteners secure said low friction flexible material to said endless belt.

24. An endless belt assembly according to claim 16, wherein said endless belt includes an underside, said bearing assemblies being secured to extend from said underside of said endless belt.

25. An endless belt assembly according to claim 16, wherein said endless belt includes an upper side, said low friction flexible material being secured to said belt and being positioned on said upper side of said endless belt.

26. An endless belt assembly according to claim 16, wherein said endless belt comprises a conical shaped belt having an inner edge and an outer edge, the dimension of said inner edge being less than the dimension of said outer edge.

27. An endless belt assembly according to claim 16, wherein said endless belt assembly includes said plurality of segments of low friction flexible material, said plurality of segments being spaced along a longitudinal edge of said endless belt.

28. An endless belt assembly according to claim 27, wherein each of said bearing assemblies are secured to said endless belt by fasteners, each of said fasteners extending through a respective segment of low friction flexible material, said fasteners securing said respective segments to said endless belt.

29. An endless belt assembly according to claim 28, wherein each of said segments includes a counter sunk hole, each of said fasteners extending through a respective counter sunk hole of said respective segment.

30. A belt turn conveyor comprising:

a bracket for securing to a support frame;

upper and lower generally horizontal bearing surfaces and upper and lower generally vertical bearing surfaces provided on said bracket;

a support beam supported by said bracket;

an endless belt;

a plurality of spaced bearing assemblies secured to said endless belt, said bearing assemblies including rollers engaging said generally vertical bearing surfaces on said bracket and restraining horizontal movement of said endless belt on the support frame; and one of a strip of low friction material and a plurality of spaced segments of low friction material secured to said endless belt, said low friction material being interposed between endless belt and said upper and lower horizontal bearing surfaces on said bracket thereby restraining vertical movement of said endless belt.

31. A belt turn conveyor according to claim 30, wherein said low friction material comprises a material selected from the group consisting of a felt material and a woven belt material.

32. A belt turn conveyor according to claim 30, wherein said low friction material comprises a needle point material.

33. The belt turn conveyor of claim 30, wherein said support beam is cantilevered from said bracket for supporting said endless belt thereon.

34. The belt conveyor of claim 30, wherein said low friction material is secured to said endless belt by at least one of an adhesive, a plurality of stitches, and a plurality of fasteners.

* * * * *